Patented Oct. 22, 1935

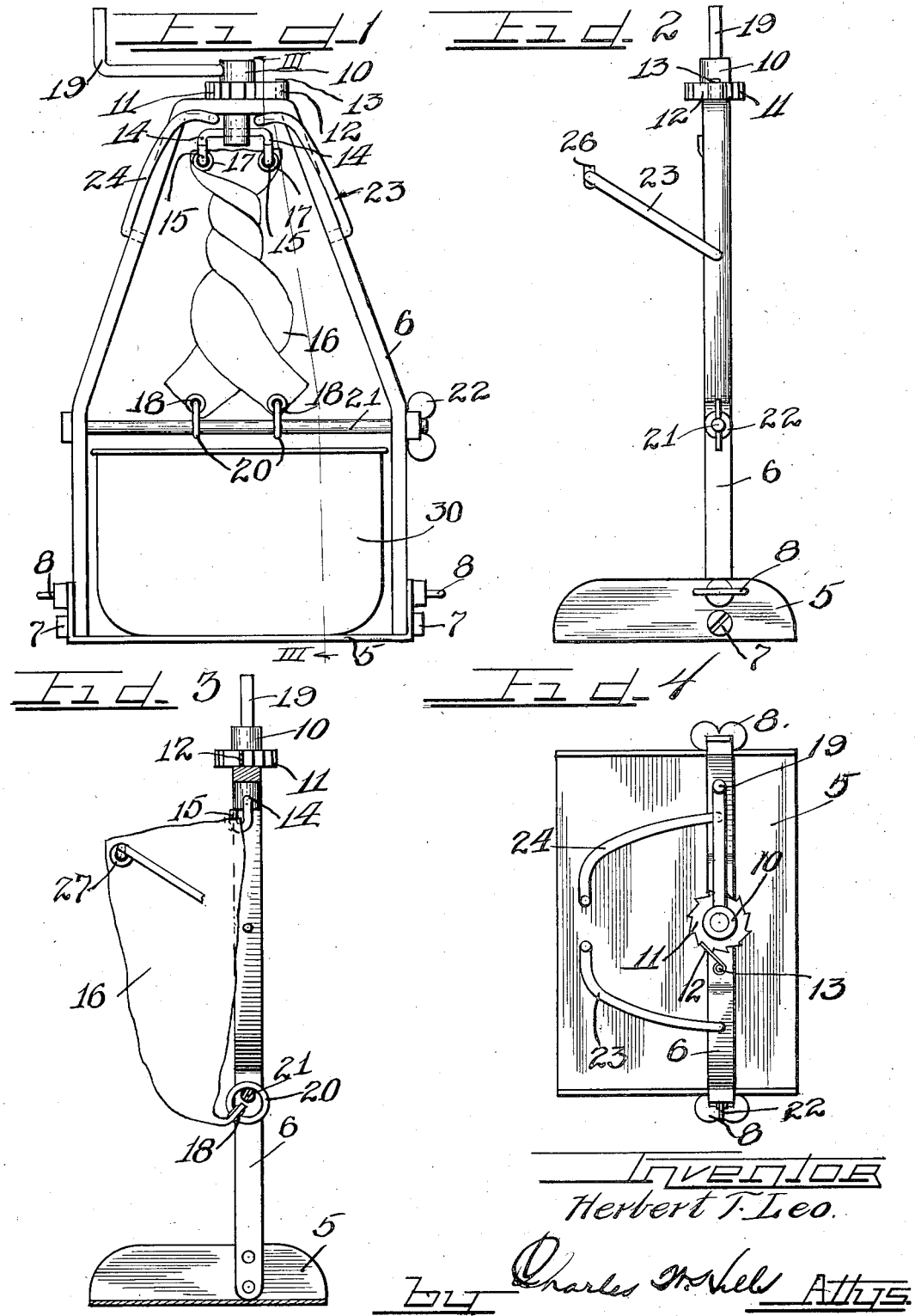

2,018,181

UNITED STATES PATENT OFFICE 2,018,181

FRUIT PRESS

Herbert T. Leo, Anaheim, Calif.

Application February 13, 1933, Serial No. 656,413

4 Claims. (Cl. 100—49)

My invention relates to a fruit press for extracting juices from fruit pulp.

The present practice in the art of extracting fruit juices from fruit pulp is to wrap the pulp in cloth or canvas and exert great pressure on the wrapped pulp by means of a mechanical or hydraulic press, thereby squeezing out the juice. The presses ordinarily considered necessary for this purpose are large and cumbersome and too expensive to be used by those desiring to obtain juices on a small scale, such, for example, as for use in the home. Thus it will be seen that there is a demand for a small, inexpensive press which will be efficient when used with only a small quantity of pulp and which will be very compact and easy to operate.

With a view to supplying this demand I have devised and constructed a press which operates upon principles which have not previously been successfully applied in this art and which make it possible to construct the press at small expense and in such a manner that its weight and bulk is much smaller than that of other presses of similar capacity. A further advantage of my press construction from the standpoint of the manufacturer is that it is easy to produce on a large scale.

It is, then, an object of my invention to produce a light, cheap and efficient press adapted for use in the preparation of fruit juices on a small scale.

Other and further advantages of my invention will be evident from the following specification and accompanying drawing.

On the drawing:

Figure 1 is a side elevational view of my press.

Figure 2 is an end elevation of the press shown in Figure 1 with parts omitted.

Figure 3 is a vertical section taken along the line III—III of Figure 1 with pulp container in unrolled position and with parts shown in elevation.

Figure 4 is a top plan view of the press shown in Figure 1.

As shown on the drawing:

A base 5 supports an upright frame 6 which is securely attached to said base by means of screws, as at 7, and bolts and butterfly nuts as at 8. When my device is not in use it may be folded into very small space for packing by removing the bolts and butterfly nuts at 8 and folding the base 5 flat against the frame 6.

Shaft 10 extends through the upper portion of frame 6 and carries a ratchet wheel 11. A ratchet 12 is attached to the frame 6 by a bolt or rivet 13 and flexibly engages the ratchet wheel 11, thereby preventing said wheel from turning in but one direction. At the lower end of shaft 10 is mounted a bar 14 which carries hooks 15 at its ends. Supported from the hooks 15 is a bag 16 which is attached to said hooks by means of two or more eyelets as at 17. The shaft 10 may be rotated by means of a crank 19 located at the upper end of said shaft.

At the closed end of the bag 16 there are two eyelets 18 through which pass rings 20. A rod 21 passes through both of the rings 20 and through the frame 6. The rod 21 is held in place by a butterfly nut 22 whereby the bag may readily be removed from the press for cleaning. Two wire arms 23 and 24 are rotatably mounted on the frame 6 and have their free ends bent as at 26 to support bag 16 in open position. This is accomplished by means of eyelets as at 27 which are adapted to be placed upon hooks 26 while eyelets 17 are held by hooks 15 thereby holding bag 16 in open position as shown in Figure 3. The wire arms 23 and 24 are loosely mounted in the frame 6 so that they may be swung up against the frame 6 when not in use. A kettle or other container 30 is placed in the position shown in Figure 1 to catch the juice which is pressed from the fruit pulp within the bag 16.

The position of the eyelets 18 at the two lower corners of the bag 16, leaving the rest of the end of said bag free, instead of providing means to hold the entire lower end of the bag against the guard 21, is a special feature of my device. By using this preferred construction the bag may be twisted more tightly and more pressure may be exerted upon the pulp than as if its entire lower end were held rigid.

To operate my press the bag is first placed in the position shown in Figure 3 and is filled with the fruit pulp to be pressed. The bag is then closed by removing the eyelets 27 from the hooks 23 and 24 and placing them upon the hooks 15. The handle 19 is then turned whereby the bag 16 containing the pulp is twisted and compressed into the position in which it is shown in Figure 1 causing the juice of the pulp to be expressed after which it drains into the container 30. The apparatus may then be taken apart and the bag cleaned preparatory to pressing another batch of pulp.

The ratchet wheel 11 and the ratchet 12 provide a special advantage over presses not equipped with this feature, since the bag may be twisted tightly and then allowed to stand over night to drain. This makes it possible to extract a much larger proportion of the juice than would otherwise be possible.

Thus it will be seen that I have provided a simple, cheap and efficient fruit press and a method of pressing juice from fruit pulp. This invention will be particularly useful when but a small quantity of fruit is to be pressed and when it would be impracticable to use more elaborate equipment.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A press comprising a frame, a rotatable member carried by said frame, attaching means on said member, a rod in spaced relation from said means, a filter bag adapted to be secured at one end to said rotatable member by said attaching means, rings secured to said bag adjacent the corners of the other end thereof for sliding along said rod and means to actuate said rotatable member whereby said bag is twisted around itself and said rings slide towards each other to permit a tighter twisting of the bag and a more thorough pressing action.

2. A fruit press comprising an upright frame, a vertical rotatable member at the top of said frame, horizontally spaced attaching means at the lower end of said rotatable member, a filter bag, a plurality of eyelets at the upper end of said bag adapted to be secured to said attaching means in superimposed position to close the bag, additional eyelets secured to said bag adjacent the corners of the other end thereof, rings disposed through said eyelets, a horizontal rod carried by said frame and extending through said rings, and means to rotate said rotatable member whereby said bag is twisted around itself and said rings slide toward each other on the rod to permit a tighter twisting of the bag.

3. A fruit press comprising a base, an upright frame structure secured to said base, said frame structure having a horizontal top portion thereon, a shaft extending through said top portion, a ratchet gear secured to said shaft, a ratchet adapted to engage with said gear secured to said frame, a crank for rotating said shaft, horizontally spaced hooks carried by said shaft at the lower end thereof, a pair of arms carried by the sides of said frame, a horizontal rod carried by said frame in spaced relation below said hooks, a filter bag having a series of eyelets around the open top thereof, and an eyelet adjacent each corner of the bottom thereof, rings inserted through the bottom eyelets for sliding along said rod, said top eyelets adapted to be secured to said hooks and to said arms for holding the bag in open position to permit insertion of material to be filtered therein, and said eyelets secured on said arms being adapted to be placed over the eyelets on said hooks to close the top of the bag whereby when said crank is rotated, said bag is twisted tightly around itself and said rings slide toward each other to permit a further twisting, said gear and ratchet preventing an untwisting of the bag.

4. In a filter press, a substantially inverted U-shaped frame, a vertical rotatable shaft extending through the top of said frame, horizontally spaced hooks carried at the lower end of said shaft, a rod extending horizontally across said frame in spaced relation from the hooks, a filter bag having eyelets at the open top thereof adapted to be secured to said hooks to close the top and support the bag within the frame, rings secured at the bottom of said bag adjacent the corners thereof, means for detaching said rod from said frame to slide the rod through said rings and a crank for rotating said shaft whereby said bag is twisted around itself and said rings slide on said rod to permit a more thorough pressing action.

HERBERT T. LEO.